United States Patent [19]

Suzuki et al.

[11] Patent Number: 5,058,119
[45] Date of Patent: Oct. 15, 1991

[54] LASER MEASURING APPARATUS

[75] Inventors: Masamichi Suzuki, Yokohama; Masaki Tomiya, Kawasaki; Yoshiharu Kuwabara, Machida, all of Japan

[73] Assignee: Mitutoyo Corporation, Tokyo, Japan

[21] Appl. No.: 464,382

[22] Filed: Jan. 12, 1990

[30] Foreign Application Priority Data

Jan. 30, 1989 [JP] Japan ................ 1-10601[U]

[51] Int. Cl.5 .................................. H01S 3/04
[52] U.S. Cl. ............................. 372/34; 372/92; 219/137.62
[58] Field of Search ............ 372/34, 92, 23, 55; 219/137.62

[56] References Cited

U.S. PATENT DOCUMENTS 4,009,965  3/1977  Pryor ........................ 356/363
4,573,159  2/1986  Aagano et al. ............ 372/34
4,697,269  9/1987  Ohara ........................ 373/34

FOREIGN PATENT DOCUMENTS 0174210  5/1987  Japan .
1335752 10/1973  United Kingdom .

Primary Examiner—Léon Scott, Jr.
Attorney, Agent, or Firm—Oliff & Berridge

[57] ABSTRACT

A laser measuring apparatus is provided with an air stirring means for making the temperature of the air in the casing uniform at every portion. The linearity of laser light in the casing is maintained regardless of generation of heat or cold transmitted to the casing, and the optical path is maintained as predetermined, thereby producing a measuring result including no error caused by the influence of heat.

5 Claims, 3 Drawing Sheets

LASER MEASURING APPARATUS

BACKGROUND OF THE INVENTION

1. Field of the Invention

The present invention relates to a laser measuring apparatus and, more particularly, to the improvement of a mechanism for securing the linearity of laser light against the heat generated in a laser light emitting portion.

2. Description of the Prior Art

Laser light is characterized by coherent monochromatic light with rays in phase with each other and is widely used in the field of a measuring apparatus such as apparatus for measuring the shape of an object from the intercepted region of laser light and the length of an object by the interference of light waves.

These laser measuring apparatuses are premised on the linearity of laser light.

Laser light, however, proceeds in the casing of a laser light emitting portion out of a predetermined optical path, sometimes resulting in generation of a large error in the measured value.

This phenomenon will be explained concretely. The air in the casing of the laser light emitting portion constitutes a medium for laser light. In the casing, heat is generated from a laser light emitting element, a driver circuit, etc. and locally heats, namely, produces what is called a heat island in the medium for laser light. The density of the air in the heat island is different from the density of the air at another portion which is not influenced by heat, thereby producing fluctuation such as heat waves.

That the density of air is different depending upon the locality means that the air as the medium has different refractive indexes depending upon the locality. Therefore, when laser light passes through the heat island, the laser light is refracted in correspondence with the refractive index of the heat island and what is called "fluctuation" is produced. In other words, it is impossible to maintain a predetermined linearity.

When measurement is carried out by a laser measuring apparatus while using an air conditioner in the environment of a high temperature, the chill from the air conditioner is transmitted to the casing of the laser light emitting portion. The cold transmitted to the interior of the casing produces a portion having a different refractive index on the medium for the laser light in the same way as in the generation of a heat island. It is therefore impossible to maintain predetermined linearity sometimes resulting in the generation of a large error in the measured value.

As a countermeasure, a laser measuring apparatus is conventionally known in which the laser light emitting element and/or the casing is covered with a heat insulating material so as to ensure the progress of laser light along a predetermined optical path in the casing of the laser light emitting portion (Japanese Utility Model Laid-Open No. 174210/1987).

In this method of using an insulating material, however, it is difficult to produce a completely insulated state, so that it cannot be said that a satisfactory effect is obtained. Especially, in the case of making the apparatus itself compact by using a semiconductor laser as a laser light emitting element, since the volume of the casing of the laser light is small, the volume occupied by the insulating material is limited, thereby making it impossible to provide many insulating members. In addition, since the thermal diffusion is limited, a more serious problem is produced.

If the means for reflecting the laser light emitted from the laser light emitting element is composed of a rotary mirror, a driving motor for rotating the rotary mirror, and a driver circuit for driving the motor, heat is also generated from the driving motor and the driver circuit, so that it is necessary to consider the influence of such heat generation.

Especially, in a laser measuring apparatus which is required to have a high resolution, the influence of the generation of heat is a very serious problem.

SUMMARY OF THE INVENTION

Accordingly, it is an object of the present invention to eliminate the above-described problems in the prior art and to provide a laser measuring apparatus which is capable of maintaining a predetermined linearity of laser light in the casing in a laser light emitting section even if heat is generated or cold is transmitted to the laser light emitting section, thereby precluding the possibility of producing a large error in the measured value.

To achieve this aim, the present invention provides a laser measuring apparatus comprising: a laser light emitting section including a laser light emitting element provided in a casing; a laser light receiving section; and a stirring means for making the temperature of the casing of the laser light emitting section uniform throughout.

In the present invention, a fan motor is preferably used as the stirring means.

In a laser light emitting section of the present invention for measuring the length of an object, the object being disposed between the laser light emitting section and the laser light receiving section from the amount of the laser light which is emitted from the laser light emitting section and has reached the laser light receiving section with a part thereof being intercepted by the object of measurement, it is preferable that the laser light emitting section is composed of a laser light emitting element, a laser light reflecting means provided with a mirror for reflecting the laser light emitted from the laser light emitting element in a predetermined direction, a lens for effecting a parallel scanning operation of the light reflected by the laser light reflecting means, a casing for accommodating the laser light emitting element, the laser light reflecting means and the lens, and a fan motor for stirring the air in the casing so as to make the temperature of the air uniform at every portion of the casing.

A laser measuring apparatus is also preferable in which the laser light reflecting means is composed of a rotary mirror, a motor for rotating the rotary mirror and a driver circuit for driving the motor, and the driver circuit is provided with a heat insulating cover for insulating the optical path of laser light in the casing from heat, and a fin provided on the heat insulating cover for introducing the wind from the motor in a desired direction.

In another preferable laser measuring apparatus, the laser light reflecting is composed of a rotary mirror, a motor for rotating the rotary mirror and a driver circuit for driving the motor, and the driver circuit also serves as the output source for the rotation of a fan motor.

According to the present invention having the above-described structure, when the air stirring means is operated, the air in the casing of the laser light emitting portion is stirred, whereby the temperature of the air is made uniform at every portion.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained hereinunder with reference to the accompanying drawings. However, the present invention is not restricted to those embodiments.

Figure 1:
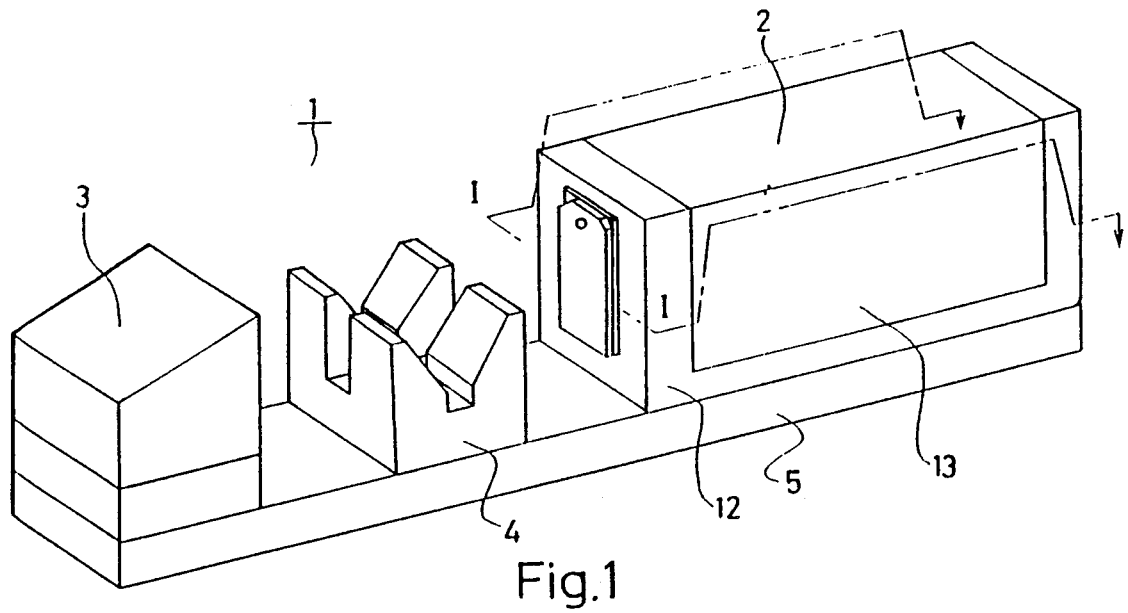
FIG. 1 is a perspective view of an embodiment of the present invention.
Figure 3:
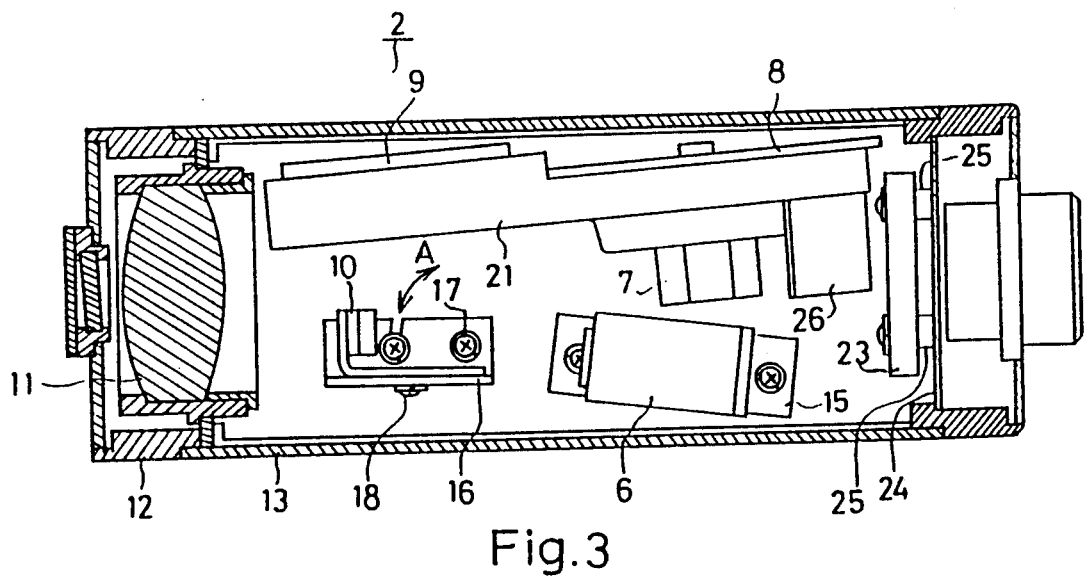
FIG. 3 is a sectional view of the embodiment shown in FIG. 1, taken along the line I—I.
Figure 2:
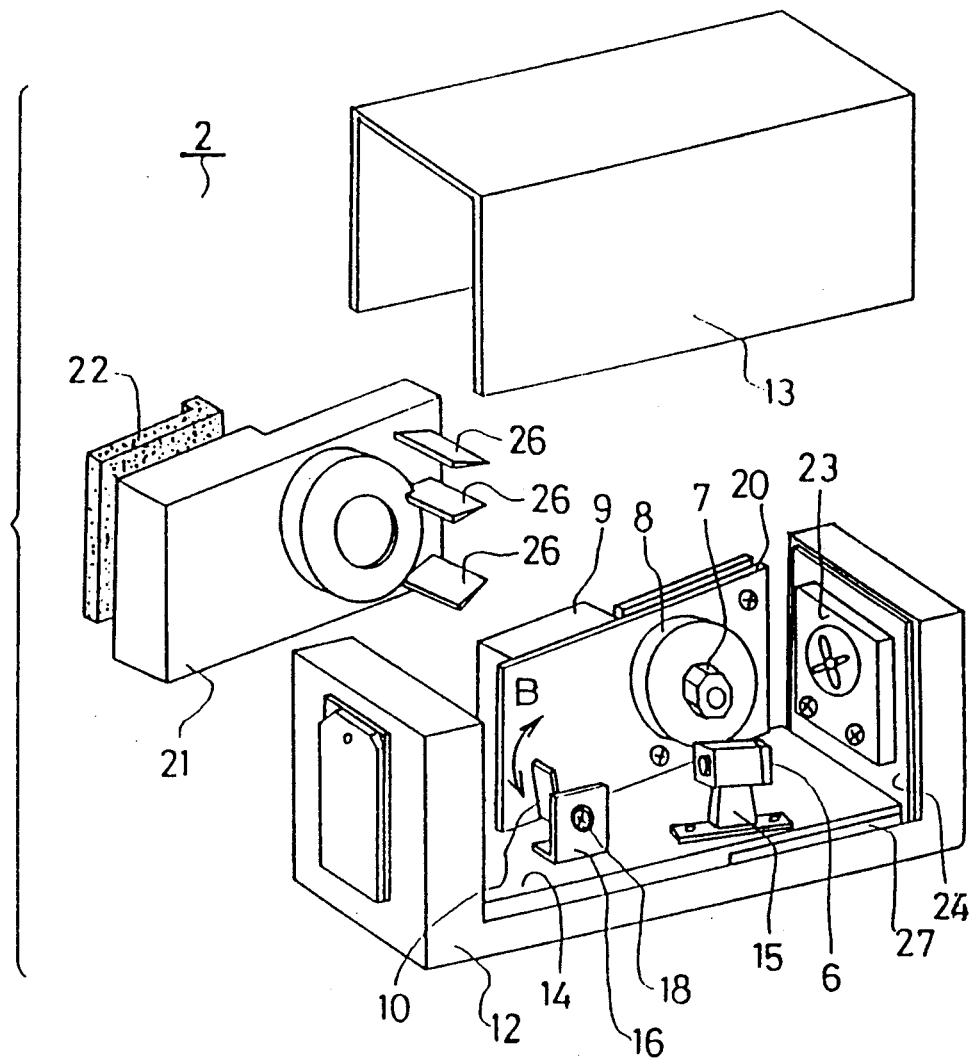
FIG. 2 is an exploded perspective view of the laser light emitting section of the embodiment shown in FIG. 1.

FIGS. 1 to 3 show an embodiment of a laser measuring apparatus according to the present invention.

Referring first to FIG. 1, which is an external perspective view of a laser measuring apparatus according to the present invention, a laser measuring apparatus 1 is provided with a laser light emitting section 2, a laser light receiving section 3, a block 4 for placing an object of measurement thereon, and a base 5 for relatively positioning the laser light receiving section 3 and fixing it thereon.

FIG. 2 is an exploded perspective view of the laser light emitting section 2 and FIG. 3 is a sectional view thereof, taken along the line I—I.

As is clear from these drawings, the laser light emitting section 2 is provided with a semiconductor laser 6 as a laser light emitting element, a rotary mirror 7 as a laser light reflecting means, a motor 8 for rotating the rotary mirror 7, a driver circuit 9 for driving the motor 8, a reflecting mirror 10 interposed between the semiconductor laser 6 and the rotary mirror 7 in the optical path of laser light for reflecting the laser light from the semiconductor laser 6 so that the laser light proceeds to the rotary mirror at a predetermined angle, a lens 11 for making the rays of the laser light from the rotary mirror 7 parallel to each other and transmitting the parallel rays to the light receiving section 3 therethrough, and a casing 12, 13 for accommodating these elements.

A substrate 14 is provided on the upper surface thereof with a stand 15 for supporting the semiconductor laser 6, and a stand 16 for supporting the reflecting mirror 10. The stand 16 can be positioned with respect to the substrate 14 so as to be rotatable around a fixing screw 17 (in the direction indicated by the arrow A in FIG. 3). The reflecting mirror 10 can be positioned with respect to the stand 16 so as to be rotatable around a fixing screw 18 (in the direction indicated by the arrow B in FIG. 2). This structure for positioning the stand 16 and the reflecting mirror 10 enables the laser light from the semiconductor laser 6 to proceed to the rotary mirror 7 at a desired angle.

A driver circuit 27 for operating the semiconductor laser 6 is provided on the under surface of the substrate 14.

The motor 8 is integrally provided with a substrate 20 of the driver circuit 9. A cover 21 is mounted on the substrate 20, as shown in FIG. 2. The cover 21 also covers the motor 8. A heat insulating material 22 is interposed between the cover 21 and the portion of the substrate 20 which corresponds to the driver circuit 9.

The present invention is characterized in that an air stirring means is provided so as to make the temperature of the laser light emitting portion uniform.

As the air stirring means, a fan motor 23 equipped with an output source is disposed in the casing 12, 13 for stirring the air in the casing 12, 13 so as to make the temperature of the air uniform at every portion of the casing 12, 13. The fan motor 23 is so composed as to be driven together with the actuation of the laser light emitting portion 2. The fan motor 23 is secured to a surface 24 through a spacer 25. A fin 26 is secured to the cover 21 so as to send the wind from the fan motor 23 in a desired direction.

The laser measuring apparatus 1 having substantially the above-described structure is operated in the following way.

After an object being measured (not shown) is placed on the block 4, laser light is radiated from the laser light emitting portion 2. That is, the driver circuit 27 is actuated so as to emit laser light from the semiconductor laser 6 and the driver circuit 9 is actuated so as to drive the motor 8, thereby rotating the rotary mirror 7. The laser light emitted from the semiconductor laser 6 proceeds to the reflecting mirror 10 and after it is reflected by the reflecting mirror 10, the laser light proceeds to the lens 11.

The laser light transmitted through the lens 11 in the form of parallel rays passes the vicinity of the object of being measured placed on the block 4 and proceeds to the laser light receiving portion 3. The length of the object of measurement is obtained from the amount of laser light which has reached the laser light receiving portion 3 without being intercepted by the object of measurement.

When laser light is output, the driver circuit 27, the semiconductor laser 6, the driver circuit 9 and the motor 8 generate heat and locally heat and locally expand the air in the vicinities of the respective elements. In this embodiment, however, the fan 23 is simultaneously actuated so as to stir the air in the casing 12, 13, so that the temperature of the air is kept uniform at every portion. In this way, the possibility of producing a locally warm portion of air in the casing 12, 13, in other words, the possibility of the local existence of air which expands due to heat and, hence, has a different density, is precluded and the air in the casing 12, 13 has a uniform density at every point.

Accordingly, the medium for the optical path of laser light from the semiconductor laser 6 to the reflecting mirror 10, the medium for the optical path of laser light from the reflecting mirror 10 to the rotary mirror 7 and the medium for the optical path of laser light from the rotary mirror 7 to the lens 11 are made of air having a uniform density. The laser light therefore proceeds along a predetermined optical path while keeping the linearity without being refracted in the course of travel. The laser light thus passes through the lens 11 along a predetermined optical path and is received by the laser light receiving portion 3. As a result, a measuring result not influenced by the heat generated in the casing 12, 13 is obtained with only a small error.

The air efficiently circulates in the casing 12, 13 due to the action of the fin 26, thereby ensuring the preclusion of the formation of a heat island.

In the laser measuring apparatus 1 of this embodiment, 1 the semiconductor laser 6 is used as the laser light emitting element, but other elements such as a helium-neon laser may be used instead.

Although the rotary mirror 7 and the motor 8 are used as the laser light reflecting means in the laser measuring apparatus 1, other means such as a tuning-fork type polarizer is also usable.

The fan motor 23 provided in the casing 12, 13 in the laser measuring apparatus 1 may be integrally provided with the casing 12, 13 or may be provided on the outside of the casing 12, 13.

In the laser measuring apparatus 1 of this embodiment, the case in which heat is generated in the casing 12, 13 is explained. In the case in which cold is transmitted to the casing 12, 13 from, for example, an air conditioner, laser light also proceeds along a predetermined optical path due to the operation of the fan motor 23 without being influenced by the cold.

Figure 4:
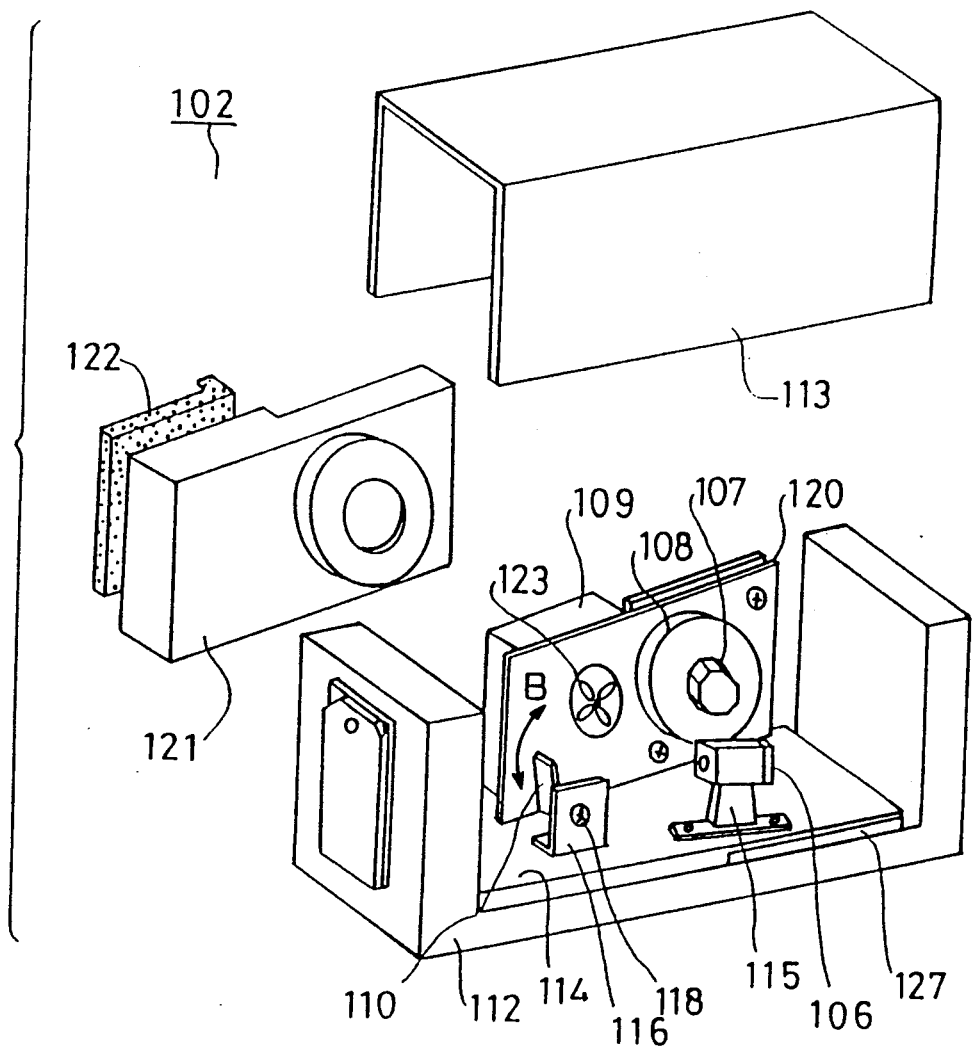
FIG. 4 is an exploded perspective view of the laser light emitting section of another embodiment.

FIG. 4 shows the laser light emitting portion in another embodiment of the present invention. The same elements as those shown in FIG. 2 are indicated by the same numerals prefixed by the numeral 1.

This embodiment is characterized in that a fan motor 123 as an air stirring means has an output source for common use with a motor 108 for driving a mirror 107.

This structure not only contributes to further miniaturization of the apparatus but also enables reduction in the number of motors which are sources of heat.

As described above, according to these embodiments, since a fan motor for stirring the air in the casing of the laser light emitting portion so as to make the temperature of the air in the casing uniform at every portion, the linearity of laser light in the casing is maintained as predetermined regardless of generation of heat or cold transmitted to the casing, thereby enabling the measuring result including no error caused by the influence of heat or cold to be obtained.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A laser measuring apparatus for measuring a workpiece, comprising:
    a workpiece holding section;
    a laser light emitting section including a casing located on one side of the workpiece holding section for emitting laser light toward the workpiece; and
    a laser light receiving section located on an opposite side of the workpiece holding section from the laser light emitting section, the laser light receiving section receiving laser light emitted from the laser light emitting section and unintercepted by the workpiece;
    wherein the casing includes:
    a laser light emitting element for emitting laser light;
    internal air distinct from ambient air outside the casing; and
    an air stirring means for stirring air in said casing without inducing a flow of the ambient air into the casing.

2. A laser measuring apparatus according to claim 1, wherein said air stirring means is a fan motor for stirring the air in said casing.

3. A laser measuring apparatus comprising:
    a laser light emitting section and a laser light receiving section for measuring a length of an object disposed between said laser light emitting section and said laser light receiving section, measuring of the length of the object being based upon a difference between an amount of laser light which is emitted from said laser light emitting section and an amount of laser light reaching said laser light receiving section, with a part of the laser light being intercepted by said object;
    said laser light emitting section including:
    a laser light emitting element for emitting laser light;
    a laser light reflecting means provided with a mirror for reflecting said laser light emitted from said laser light emitting element;
    a lens for effecting a parallel scanning operation of the laser light reflected by said laser light reflecting means;
    a casing having internal air therein distinct from ambient air outside of the casing, the internal air having a temperature, the casing having therein said laser light emitting element, said laser light reflecting means and said lens; and
    a fan for stirring the air in said casing without inducing a flow of the ambient air into the casing so as to make the temperature of the air uniform in said casing.

4. A laser measuring apparatus according to claim 3, wherein said laser reflecting means includes a rotary mirror, a motor for rotating said rotary mirror and a driver circuit for driving said motor, and said driver circuit is provided with a heat insulating cover for insulating an optical path of laser light in said casing from heat, and a fin provided on said heat insulating cover for introducing wind from said motor in a desired direction.

5. A laser measuring apparatus according to claim 3, wherein said laser light reflecting means includes a rotary mirror, a motor for rotating said rotary mirror and a driver circuit for driving said motor, said driver circuit also serving as the output source for the rotation of said fan motor.

* * * * *